United States Patent
Hätinen et al.

(10) Patent No.: US 6,458,215 B1
(45) Date of Patent: Oct. 1, 2002

(54) METHOD OF WASHING VEHICLES

(75) Inventors: Timo Hätinen, Tampere; Esa Syvälahti, Nokia, both of (FI)

(73) Assignee: Tammermatic Oy, Tampere (FI)

( * ) Notice: Subject to any disclaimer, the term of this patent is extended or adjusted under 35 U.S.C. 154(b) by 0 days.

(21) Appl. No.: 09/582,946

(22) PCT Filed: Feb. 3, 1999

(86) PCT No.: PCT/FI99/00076

§ 371 (c)(1),
(2), (4) Date: Sep. 13, 2000

(87) PCT Pub. No.: WO99/39949

PCT Pub. Date: Aug. 12, 1999

(30) Foreign Application Priority Data

Feb. 5, 1998 (FI) .................................................. 980262

(51) Int. Cl.⁷ .............................. B08B 3/02; B08B 3/04
(52) U.S. Cl. .............................. 134/26; 134/32; 134/36; 134/37; 134/42
(58) Field of Search ............................ 134/26, 32, 36, 134/37, 42

(56) References Cited

U.S. PATENT DOCUMENTS

| 3,409,030 A | 11/1968 | Schmidt |
| 4,135,533 A | 1/1979 | Gall et al. |
| 4,865,058 A | 9/1989 | Crotts et al. |
| 5,016,662 A | 5/1991 | Crotts et al. |

FOREIGN PATENT DOCUMENTS

| DE | 3632554 | 4/1988 |
| FI | 3085/67 | 11/1967 |
| FR | 2627306 | 8/1989 |

*Primary Examiner*—Zeinab El-Arini
(74) *Attorney, Agent, or Firm*—Burns, Doane, Swecker & Mathis, L.L.P.

(57) ABSTRACT

A method of washing vehicles in which a vehicle is washed by an automatic vehicle washing apparatus. The washing apparatus includes a prewashing and washing device, which are arranged to move in relation to the vehicle to be washed in the longitudinal direction of the vehicle. Prewash agent is fed to the surface of the vehicle to be washed with the pseudo-pressure of the prewash exceeding 8 bar.

4 Claims, 1 Drawing Sheet

METHOD OF WASHING VEHICLES

Figure 1:
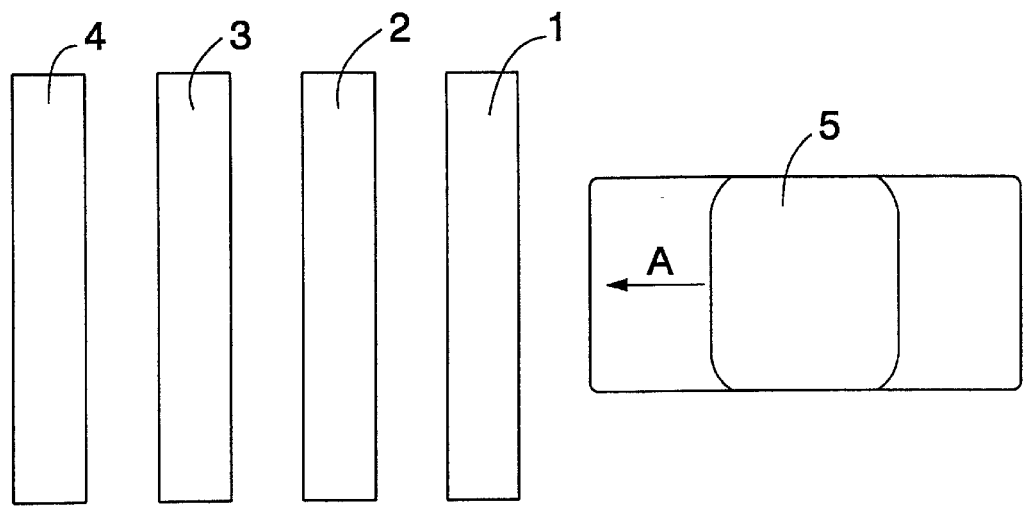

This is a national stage application of PCT/F199/00076 filed Feb. 3, 1999.

1. Field of the Invention

The method relates to a method of washing vehicles by an automatic vehicle washing apparatus comprising at least means for prewashing and means for actual washing, said means and the vehicle to be washed being arranged to move in relation to each other in the longitudinal direction of the vehicle to be washed, whereby the vehicle is prewashed by spraying prewash agent onto the surface of the vehicle during prewash, and washed.

2. Background of the Invention

An automatic vehicle washing apparatus typically comprises means for prewashing, means for actual washing, and means for drying. In addition to these means, the washing apparatus may also comprise other means according to the need, such as means for rinsing off detergents. The means and the vehicle to be washed are arranged to move in relation to each other in the longitudinal direction of the vehicle to be washed. Finnish application 924,420, for example, discloses an automatic vehicle washing equipment. When a vehicle is being washed by an automatic vehicle washing apparatus, the problem compared e.g. with handwash is that it is very difficult to ensure a sufficiently good washing result. To ensure a sufficiently good result, frequently excessive amounts of water, chemicals and washing time have to be employed, resulting in a waste of energy, water and chemicals.

SUMMARY OF THE INVENTION

It is the object of the present invention to provide a method of washing vehicles in an automatic vehicle washing apparatus, the method avoiding the above drawbacks.

The method of the invention is characterized by spraying the prewash agent onto the surface of the vehicle to be washed with the pseudo-pressure of the prewash agent exceeding 8 bar.

In association with automatic vehicle washing apparatuses, the prewash agent is typically sprayed onto the surface of the vehicle to be washed at a very low pressure. The typical pressure employed by e.g. a pump is about 5 bar, prewash agent being spread onto the surface of the vehicle practically without pressure, allowing for the effects of pressure losses. When tests were performed it was unexpectedly observed that by feeding the prewash agent onto the surface of the vehicle at a higher pressure, the washing result improved. The most unexpected observation was that with a further increase in pressure, the washing result was impaired after a given limit. Accordingly, it is essential to the invention that prewash agent is sprayed onto the surface of the vehicle to be washed at a sufficiently high pressure, but preferably not at an excessively high pressure.

It is an advantage of the invention that the washing result improves and/or the washing time can be reduced.

BRIEF DESCRIPTION OF THE DRAWING FIGURES

Figure 2:
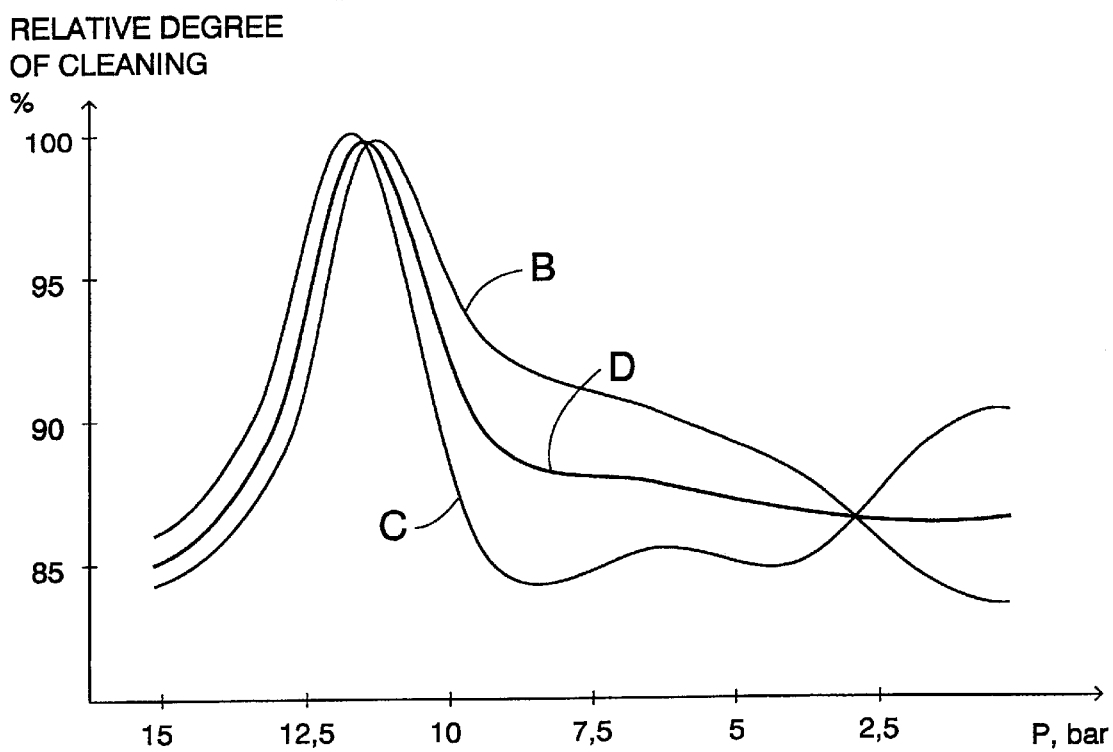

The invention will be described in greater detail in the accompanying drawing, in which FIG. 1 schematically shows a top view of an automatic vehicle washing equipment, and FIG. 2 is a diagram showing the washing result with prewash agent being fed at varying pressures.

DETAILED DESCRIPTION OF THE PREFERRED EMBODIMENT

FIG. 1 shows an automatic vehicle washing apparatus. FIG. 1 shows a vehicle washing line comprising substantially stationary units in relation to which a vehicle 5 to be washed is moved as shown by arrow A. The washing units are typically formed as a gantry below which the vehicle to be washed is moved. The means for moving the vehicle and the basic structure of the washing units are fully known per se, wherefore they are not described more closely herein. Means 1 for prewashing are arranged first in the direction of movement of the vehicle 5 to be washed. These means are used to spray prewash agent onto the surface of the vehicle. A prewash concentrate is typically used with e.g. an about 90% addition of water, and then the mixture of water and prewash concentrate is typically sprayed by nozzles having V-shaped openings onto the surface of the vehicle 5. Means 2 for actual washing are arranged next. The means 2 for actual washing preferably comprise high-pressure nozzles for directing high-pressure water jets onto the surface of the vehicle 5 for cleaning the vehicle 5. The wash line may then comprise a rinsing unit 3 for rinsing the vehicle, and means 4 for drying the vehicle 5. Naturally, an automatic vehicle washing apparatus may also comprise other units fully known per se, but for the sake of clarity they are not discussed more closely herein. The number and location of different units and the distance between them may vary according to the need. An automatic vehicle washing apparatus can further be arranged in such a way that the means and units 1 to 4 are moved along e.g. a rail in the longitudinal direction of the vehicle 5 with the vehicle 5 remaining substantially stationary. In such a known solution the means and units 1 to 4 are typically arranged in the same gantry structure.

FIG. 2 shows the washing percentage as the pressure of the prewash agent varies. Curve B depicts the measurement result obtained with a sample, and curve C depicts the measurement result obtained with another sample. Curve D depicts the average value of the measurement results. The horizontal axis shows the pseudo-pressure P of the prewash agent. The attribute pseudo-pressure P of the prewash agent refers to the pressure affecting the surface of the vehicle and having a numerical value of the size of the pressure of the prewash agent at the nozzle with the nozzle at about 25 cm distance from the surface of the vehicle. Hence, if the nozzle is arranged e.g. 15 cm from the surface of the vehicle, and the intention is to reach a 10 bar pseudo-pressure, the pressure at the nozzle is consequently less than 10 bar Similarly, if the pressure at the nozzle is 14 bar, a 10 bar pseudo-pressure is reached by placing the nozzle more than 25 cm from the surface of the vehicle. The vertical axis shows the cleaning result, i.e. the relative degree of cleaning in percent, indicating the cleanness improvement achieved at the cleaned spot divided by the difference between a clean and a dirty unwashed spot.

The tests performed show that the cleaning result improves as the pseudo-pressure P of the prewash agent increases. An improvement in the cleaning result is apparent at least in some cases when the pseudo-pressure P of the prewash agent exceeds 8 bar. On the other hand, an increase in pressure resulted in an impaired cleaning result, and consequently, when the pseudo-pressure P of the prewash agent exceeds 16 bar, no substantial improvement in the cleaning result could be observed. Usually the cleaning result improves as the amount of prewash agent increases. However, by changing the pressure, although the amount of prewash agent increases as the pressure increases, the cleaning result impaired as the pressure exceeded 16 bar. Particularly advantageous cleaning results have been achieved with the pseudo-pressure P of the prewash agent varying between 10 and 14 bar. The properties of the detergent used and the changes in temperature affect the determination of the most efficient pressure range. The final result is further affected by the dirt on the surface of the vehicle. Hence, if the duration of the actual washing is kept the same, a better washing result is achieved. On the other hand, the actual washing time may be reduced if the previous washing result has been sufficiently good. If the time during which prewash agent is fed is the same as before, and a high pressure is used, the amount of prewash agent used naturally increases slightly. When using high pressure, the prewash agent can, however, be spread onto the surface of the car faster, resulting in no increase in the amount of prewash agent.

The drawing and the related description are only intended to illustrate the inventive idea. The details of the invention may vary within the scope of the claims. Consequently the means 2 for washing can be e.g. brushes. The effect of the high pressure of the prewash agent is most advantageously observed when nozzles providing a high-pressure water jet are used. The nozzles are preferably oscillating point jet nozzles producing a point-like jet with a pressure that is sufficiently high even on the surface of the vehicle.

What is claimed is:

1. A method of washing vehicles by an automatic vehicle washing apparatus comprising the steps of:

providing means for prewashing and means for actual washing;

arranging said prewashing means and washing means and a vehicle to be washed to move in relation to each other in a longitudinal direction of the vehicle;

prewashing the vehicle by spraying prewash agent onto a surface of the vehicle with a pseudo-pressure of the prewash agent exceeding 8 bar; and washing the vehicle.

2. The method as claimed in claim 1, wherein the pseudo-pressure of the prewash agent is less than 16 bar.

3. The method as claimed in claim 1, wherein the pseudo-pressure of the prewash agent is between 10 and 14 bar.

4. The method as claimed in claim 1, wherein the actual washing of the vehicle is performed by high-pressure water jets.

* * * * *